Jan. 17, 1950  C. V. LASSMANN ET AL  2,494,884
COMBINED FUEL PUMP, SELECTOR VALVE AND STRAINER
Filed March 13, 1947  3 Sheets-Sheet 1

INVENTORS
CLYDE V. LASSMANN
NOEL NAIDENOFF
BY
Philip S. Moran
ATTORNEY

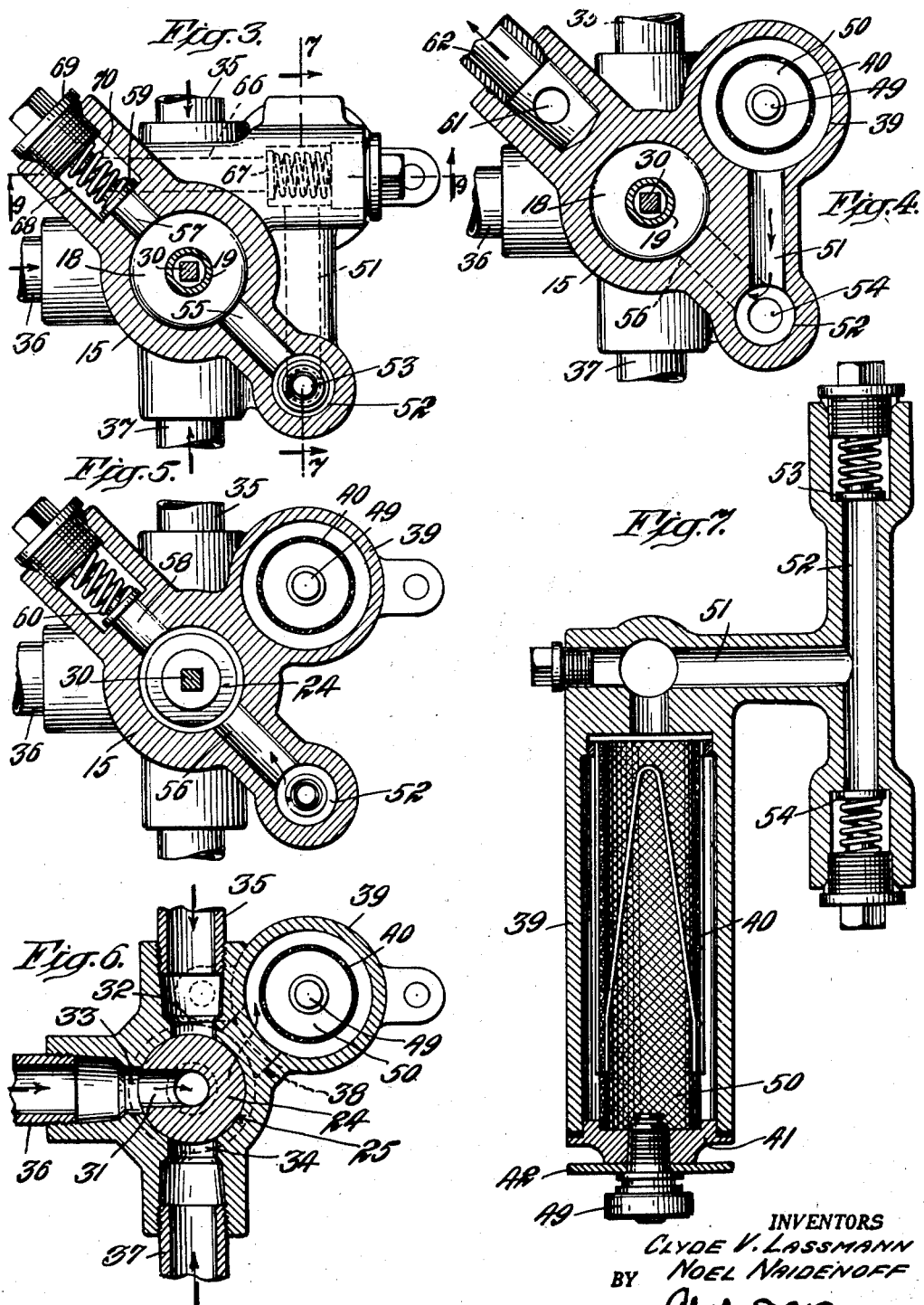

Jan. 17, 1950 C. V. LASSMANN ET AL 2,494,884
COMBINED FUEL PUMP, SELECTOR VALVE AND STRAINER
Filed March 13, 1947 3 Sheets-Sheet 3

INVENTORS
CLYDE V. LASSMANN
NOEL NAIDENOFF
BY
Philip S. McBean
ATTORNEY

Patented Jan. 17, 1950

2,494,884

UNITED STATES PATENT OFFICE 2,494,884

COMBINED FUEL PUMP, SELECTOR VALVE, AND STRAINER

Clyde V. Lassmann and Noel Naidenoff, Wichita, Kans., assignors to Beech Aircraft Corporation, Wichita, Kans., a corporation of Delaware Application March 13, 1947, Serial No. 734,334

3 Claims. (Cl. 103—2)

1

The invention herein claimed is a combined fuel pump, selector valve and strainer.

In aircraft engine fuel systems it is considered necessary to provide strainers and settling basins in the lines between fuel tanks and engines.

Selector valves are provided to enable proper control of fuel from different tanks.

A line pump is desirable for priming engines at starting and for assisting the engine pumps in case of faulty operation.

These several features have usually been provided as separate units, taking up space and adding weight as such, requiring individual mountings and more or less complicated piping, joints and couplings.

It is the primary object of the present invention to combine all these several units in one, compact, small size, light weight structure which will require but one mounting, take up small space and eliminate the usually required piping and connections.

Related objects are to provide a safer and more reliable fuel supply system by so combining the several necessary functional elements and by rendering them operable and controllable in a safe and practical manner.

Other objects of the invention are to effect reductions in cost of equipment, installation, maintenance and servicing.

Special objects are to accomplish savings in time required for tank selecting and fuel pumping operations, strainer cleaning and other operations.

Other desirable objects attained by the invention will appear in the course of the following specification.

The drawings accompanying and forming part of the specification illustrate a present commercial embodiment of the invention. Structure, however, may be modified and changed as regards the present illustration, all within the true intent and broad scope of the invention as hereinafter defined and claimed.

Fig. 1 in the drawings is a vertical sectional view of one of the combined units, this section being taken on substantially the plane of line 1—1 of Fig. 8, the pump and valve operating handle being shown broken.

Fig. 2 is a similar vertical sectional view on substantially the plane of line 2—2 of Fig. 8;

Figs. 3, 4, 5 and 6 are broken horizontal sectional views on substantially the planes of line 3—3, 4—4, 5—5 and 6—6 of Fig. 1;

Fig. 7 is a vertical sectional view through the

2 strainer portion of the apparatus on substantially the plane of line 7—7 of Fig. 3;

Figure 8:
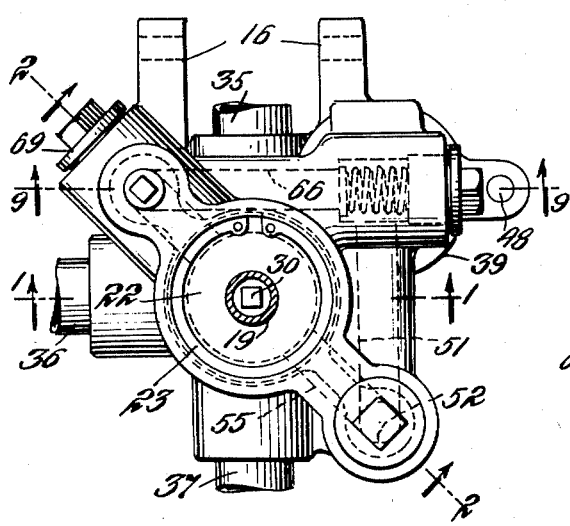
Fig. 8 is a broken top plan view of the combination unit.

In this invention, all the essential elements such as indicated above are built into a single body member 15 having lugs 16, Fig. 8, or other such means by which the unit may be mounted and secured in place.

The body structure is shown as having within it a more or less centrally disposed pump cylinder 17 in which operates a piston 18 carried by a tubular rod 19 having an external operating handle 20.

The hollow piston rod 19 is shown as operating up through packing 21 in the head 22 closing the upper end of the cylinder chamber, removably secured in place by the split spring locking ring 23.

The lower end of the pump cylinder is shown as closed by an upwardly tapered valve plug 24 seated in the correspondingly tapered valve chamber 25 concentrically located at the foot of the pump cylinder.

The valve plug 24 is supported and held upwardly in properly seated relation by spring 26 supported by the head 27 closing the lower end of the valve chamber and removably secured by the spring locking ring 28.

To enable the valve plug being turned by the piston, the latter is shown as having a squared passage 29 therethrough opening up through the tubular piston rod 19 and the valve body is shown as carrying a squared stem 30 extending in relatively slidable relation up through said passage.

The telescopic coupling thereby provided enables the piston to be pumped up and down without interfering with the valve and provides for the valve to be turned by rotative movement of the pump handle 20.

The valve plug 24 is shown as having a single angular passage 31 opening inwardly through the side and extending downwardly through the bottom of the same to register, in this particular instance, with any one of the three inlet ports 32, 33, 34, in the side of the valve body or casing 25.

Fig. 6 shows how the three inlet ports 32, 33, 34, may be connected with supply lines 35, 36, 37, running from three different fuel tanks.

At the bottom of the valve chamber, below the valve plug 24, a side port 38 opens laterally into a strainer chamber 39 containing a screen 40 carried by a plug 41 closing the lower end of such chamber.

The strainer plug 41 is shown as secured in quickly removable relation by a swing plate 42 having a hooked engagement at one end at 43 over the nut 44 on a supporting stud 45, and a hooked engagement at the opposite end at 46 over a wing nut 47 on screw stud 48. The intermediate portion of this plate engages the closure and screen supporting plug 41 pivoting on the removable drain plug 49 in that closure, making it possible to quickly remove the screen and to put it back in place on rotating plate 42 to effect its release from or its hooked engagement with the nuts 44, 47, on the supporting studs 45, 48.

Adjustment of nut 44 and thumb-screw 47 enables the screen carrying plug 41 to be tightly secured in place. Removal may be effected by simply loosening the wing nut 47 to relieve the pressure on that end of the swing plate 42. When this plate is turned to unhook it from the supporting studs the strainer will come out freely. At such time the plain nut 44 may usually be turned by hand if such adjustment be desirable. Then when the parts are replaced the final adjustment may be provided by turning the wing nut 47 by hand.

The drain plug 49 may have a screw engagement in the screen plug 41 so that it may be taken out at any time without removing the screen, to clear any collection of foreign matter from the settling basin portion 50, Fig. 7, in the bottom of the strainer chamber.

Figure 2:
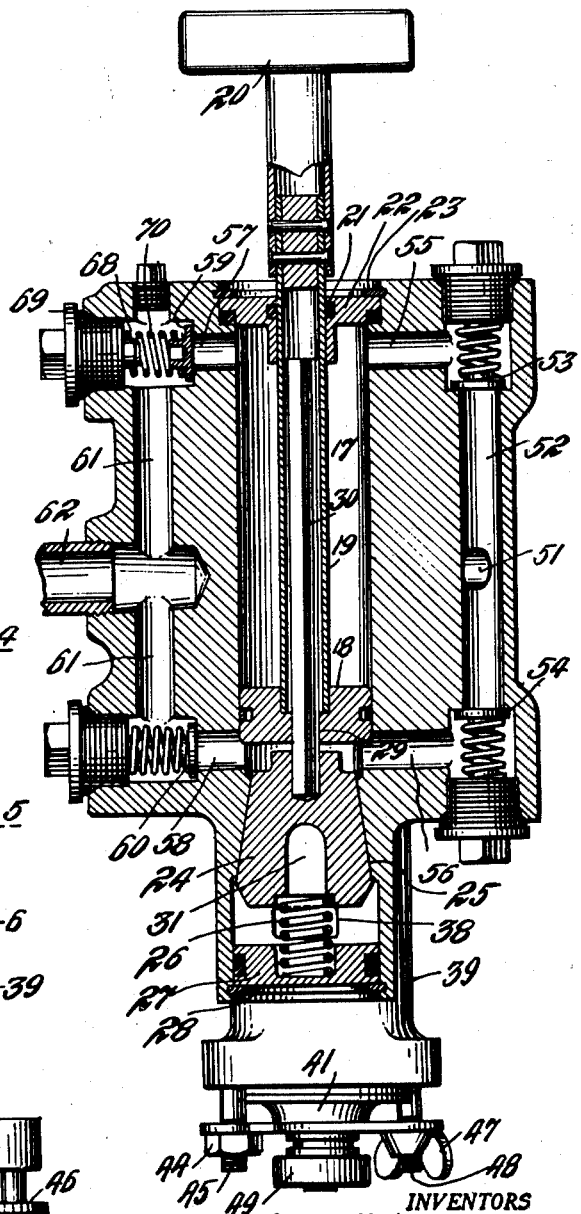

After passage through the strainer and settling chamber the liquid flows upwardly and laterally through passage 51, Fig. 7, into vertical passage 52 having spring closed check valves 53, 54, at upper and lower ends of the same, opening to lateral passages 55, 56, Fig. 2, delivering into the upper and lower ends of the pump cylinder 17.

Outlet passages or ports 57, 58, Fig. 2, at the upper and lower ends of the pump cylinder, controlled by outwardly opening spring check valves 59, 60, admit liquid to a vertical passage 61, to which is connected the fuel delivery pipe 62.

Figure 1:
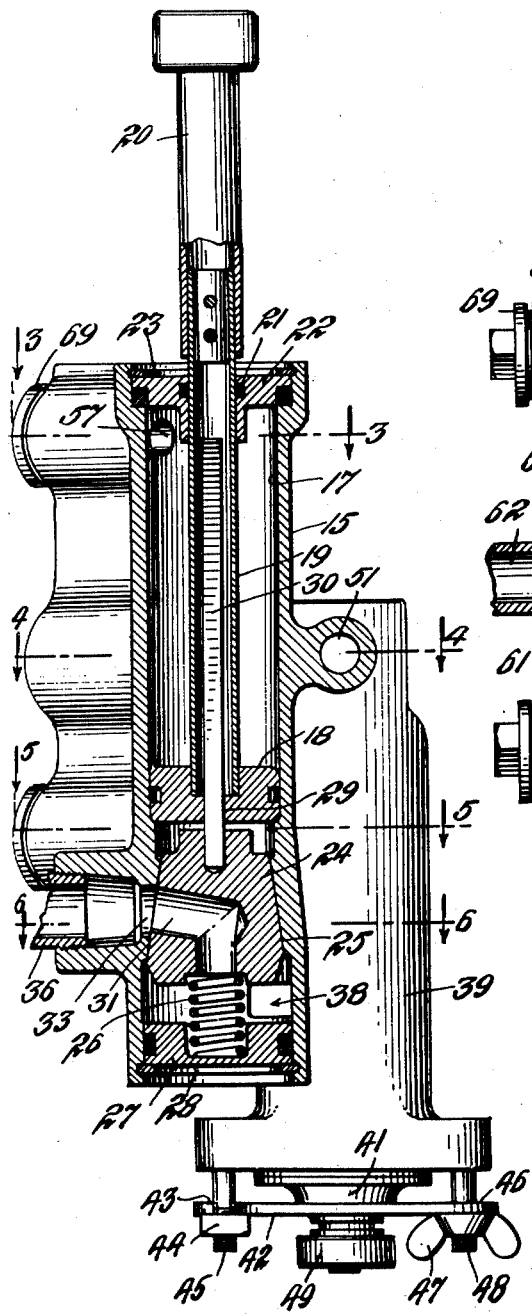

Fig. 1 shows the selector valve registered with the intermediate inlet port 33 to draw fuel through pipe 36. On the upstroke of piston 18, fuel will pass down through the passage 31 in valve plug 24, through port 38 into the base of strainer chamber 39 and, after screening, up through that chamber and out by passages 51, 52, Fig. 7, and downwardly past valve 54, Fig. 2, and into the bottom of the pump cylinder through port 56.

In such upstroke, liquid above the piston will be forced out through port 57 and past check valve 59 into the outlet passage 61 and delivery pipe 62.

On the downstroke of the piston, liquid will be drawn upwardly through vertical passage 52, past the upwardly opening check valve 53 and through the top port 55, in back of the lowering piston, while the liquid below the piston is being forced out through the lower delivery port 58 past the check valve 60 into the delivery passage 61.

At any time in the pumping operations, or when the pump is not being operated, the pump handle may be turned to register the selector valve with a different fuel tank line.

Additionally, if desired, the handle may be turned to carry the valve plug to a shutoff position, cutting off all fuel tanks. Such a position would be, in the example, with the valve turned approximately 180° in Fig. 6, to carry the valve port 31 in line with a solid portion of the valve chamber wall.

Figure 10:
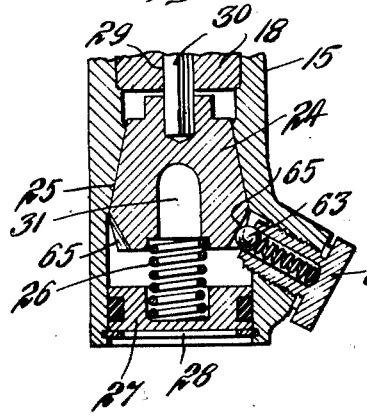
Fig. 10 is a broken sectional detail of the selector valve as taken on substantially the plane of line 10—10 of Fig. 11.
Figure 11:
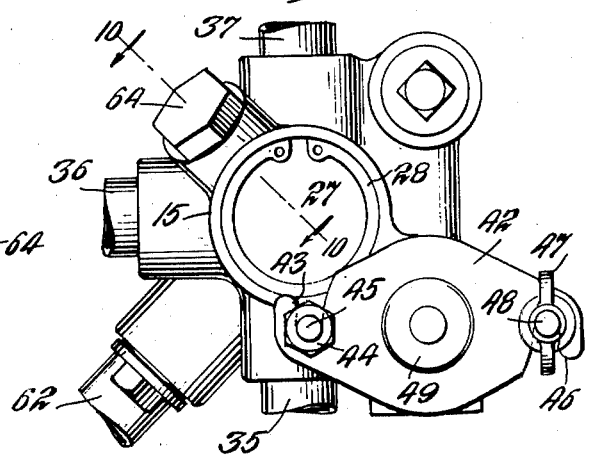
Fig. 11 is a broken bottom plan view of the device.

To aid in "finding" and registering the valve with different selected tanks, a clicking type of detent may be employed, such as that shown in Fig. 10, where a spring pressed ball 63 carried by a screw plug 64 set in the side of the valve case 25, engages in properly spaced notches 65 in the lower end portion of the valve plug.

The spring detent illustrated provides for quick, positive indexing of the valve and enables the pilot to "feel" the way from one tank selection to another and to know when the valve is properly set.

This compounding of the pump and selector valve with the accurate indexing disclosed enables a pilot to quickly shift from one tank to another for ascertaining or testing whether and which tanks are full or empty.

Figure 9:
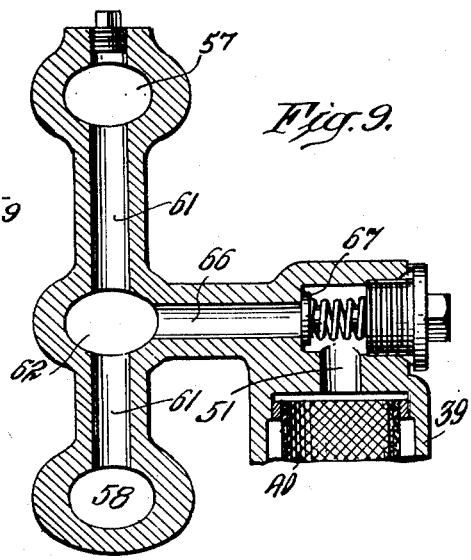
Fig. 9 is a broken vertical sectional view on substantially the plane of line 9—9 of Fig. 3.

In addition to the foregoing features, pressure relief is provided in the present illustrated embodiment by extending a lateral passage 66, Figs. 8 and 9, from the delivery passage 61 past a spring closed relief valve 67 into one side of the discharge passage 51 in the top of the strainer chamber.

The spring closed check valves 53, 54, 59, 60 and 67, may be all of the same type, that is, like the upper discharge valve 59 shown in Fig. 2, operating in a chamber 68 closed by a screw plug 69 and acted on by a spring 70.

In the unit disclosed the pump and strainer chambers are closely associated in side-by-side, substantially parallel relation, with short internal connecting passages. The valve is directly in line with and at the bottom of the pump cylinder.

This all contributes to a small, compact, light weight, low cost structure which occupies but small space and which can be mounted within convenient reach of the pilot. No external piping or connections are required, only the leads from the fuel tanks and the piping to the engine. Only one control handle is present and the pilot may use that for selecting or pumping purposes, or at times for either or both purposes.

In either or both selecting and pumping the pilot has the assurance that the fuel, from whatever source, is properly strained. The strainer screen can be quickly removed for cleaning just by loosening the one thumb-screw and turning the hook plate. The settling basin can be cleared at any time by simply removing the plug in the bottom of the screen supporting cover.

The pressure relief is an additional safety factor, automatically by-passing liquid under excess pressure back into the low pressure side of the pump.

While ordinarily operated by hand, the pump and selector valve may be operated by a motor or motors. The structure of pump, selector valve, strainer and settling basin may be varied to suit special requirements, for example for handling different kinds of fuels or other liquids than fuels.

The valves of the pump and pressure relief are faced to pass the liquid under action of the engine driven pump with which the unit may be connected so that the unit may assist without impeding engine driven flow.

While shown as selecting fuel from three different sources, the selector valve may be designed for any other number of selective steps and may or may not include the complete shutoff stage of operation.

The body of the unit may be a single casting with the necessary chambers and connecting passages cored, drilled or machined therein, substantially as here shown. This saves weight, space and expense and avoids possibility of leaks in the connections between the different elements of the apparatus.

What is claimed is:

1. A combined fuel pump, selector valve and strainer comprising a body member having a pump cylinder and a strainer chamber in closely adjoining relation, a valve seat at the foot of the pump cylinder, inlet ports opening into the side of the valve seat, a passage extending from the bottom of the valve seat into the strainer chamber, a passage extending from the strainer chamber to the pump cylinder and a delivery passage extending from the pump cylinder, a piston rotatably and reciprocally operable in said pump cylinder and provided with an external handle for rotating and reciprocating the same, a valve element rotatable in said valve seat and having a side port to register with said inlet ports and opening down through the bottom of the valve element to said passage leading to the strainer chamber and a telescopically engageable rotary drive connection between said piston and valve element enabling the piston to be pumped independently of the valve and the valve to be turned independently of the piston by simple reciprocating and rotary movements of said handle and whereby all liquid passing to and delivered by the pump will be strained whichever inlet port is selected by the valve, a readily removable closure for the bottom of the strainer chamber and a screen carried by and removable with said closure, said closure including a plug carrying said screen and a plate rotatably engaged therewith and having hooked ends, screw studs dependent from the body member in line with said hooked ends and nuts on said screw studs for engagement by said hooked ends and one at least being hand operable for quick tightening or releasing hand adjustments.

2. A combined fuel pump, selector valve and strainer comprising a generally upright pump cylinder having a concentric elongation at the lower end of the same forming a valve chamber, a strainer cylinder at one side of and substantially parallel with said pump cylinder and having an inlet passage extending from the lower end of said valve chamber to the lower end of the strainer cylinder and an outlet passage extending from the top of the strainer cylinder to the upper and lower ends of the pump cylinder, a pump piston operable in said pump cylinder and having a tubular operating handle extending up through the top of the pump cylinder, said pump piston being rotatably adjustable as well as reciprocably movable in said pump cylinder by said handle, a removable closure for the lower end of the valve chamber, a valve plug rotatable in said valve chamber and having a non-circular operating stem extending in slidingly keyed relation up through said piston and tubular operating handle, said valve plug and operating stem being removable through the lower end of the valve chamber when the closure therefor is removed, said valve chamber having inlet ports in the side of the same and said valve plug having a port in the side of the same to register with said valve chamber ports and open through the bottom of the plug to pass entering fuel to said inlet passage to the lower end of the strainer cylinder, a removable closure for the lower end of the strainer cylinder and a discharge passage extending from the opposite ends of the pump cylinder.

3. A combined fuel pump, selector valve and strainer comprising a generally upright pump cylinder having a concentric elongation at the lower end of the same forming a valve chamber, a strainer cylinder at one side of and substantially parallel with said pump cylinder and having an inlet passage extending from the lower end of said valve chamber to the lower end of the strainer cylinder and an outlet passage extending from the top of the strainer cylinder to the upper and lower ends of the pump cylinder, a pump piston operable in said pump cylinder and having a tubular operating handle extending up through the top of the pump cylinder, said pump piston being rotatably adjustable as well as reciprocably movable in said pump cylinder by said handle, a removable closure for the lower end of the valve chamber, a valve plug rotatable in said valve chamber and having a non-circular operating stem extending in slidingly keyed relation up through said piston and tubular operating handle, said valve plug and operating stem being removable through the lower end of the valve chamber when the closure therefor is removed, said valve chamber having inlet ports in the side of the same and said valve plug having a port in the side of the same to register with said valve chamber ports and open through the bottom of the plug to pass entering fuel to said inlet passage to the lower end of the strainer cylinder, a removable closure for the lower end of the strainer cylinder and a discharge passage extending from the opposite ends of the pump cylinder, said valve chamber having an upwardly tapered valve seat for the valve plug and the latter being correspondingly tapered, and a spring interposed between the lower end of said tapered valve plug and closure for yieldingly holding the valve plug upwardly in seated relation in the valve chamber.

CLYDE V. LASSMANN.
NOEL NAIDENOFF.

REFERENCES CITED

The following references are of record in the file of this patent:

UNITED STATES PATENTS

| Number | Name | Date |
|---|---|---|
| 1,213,693 | Schmeltz | Jan. 23, 1917 |
| 1,822,287 | Harding, Jr. | Sept. 8, 1931 |
| 1,986,971 | Hickert | Jan. 8, 1935 |
| 2,011,304 | Sharp | Aug. 13, 1935 |
| 2,189,674 | Parker | Feb. 6, 1940 |